United States Patent [19]

Wakai et al.

[11] Patent Number: 4,784,818

[45] Date of Patent: Nov. 15, 1988

[54] METHOD FOR MOLDING SUPERPLASTIC CERAMIC

[75] Inventors: Fumihiro Wakai; Shuzo Kanzaki; Shuji Sakaguchi, all of Nagoya, Japan

[73] Assignee: Agency of Industrial Science & Technology, Ministry of International Trade & Industry, Tokyo, Japan

[21] Appl. No.: 845,568

[22] Filed: Mar. 28, 1986

[30] Foreign Application Priority Data

Jun. 14, 1985 [JP] Japan .................................. 60-130478

[51] Int. Cl.$^4$ .............................................. C04B 35/48
[52] U.S. Cl. .................................... 264/291; 264/325; 264/332
[58] Field of Search ........................ 264/332, 291, 325

[56] References Cited

U.S. PATENT DOCUMENTS 4,525,464  6/1985  Claussen et al. ...................... 501/104

OTHER PUBLICATIONS

The Japan Economic Journal, p. 16, Jul. 3, 1985.
Ceramic Engineering and Science Proceedings (Jul.-Aug. 1984) pp. 530–545.
Extended Abstracts, American Ceramic Society, 87th Annual Meeting, 5/5–5/9, 1985, pp. 298, Abstract 12-F-H-85.
High-Tech Materials Alert, 6/85 p. 4.
Burke, J.J., et al., Advances in Deformation Processing, pp. 405–421, Phenum Press.

*Primary Examiner*—James Derrington
*Attorney, Agent, or Firm*—Oblon, Fisher, Spivak, McClelland & Maier

[57] ABSTRACT

A shaped article of superplastic ceramic composed of zirconia toughened ceramic containing, or not containing, fine alumina powder is produced by deforming the ceramic under the action of stress at a temperature in the range of superplastic temperatures thereof.

6 Claims, No Drawings

METHOD FOR MOLDING SUPERPLASTIC CERAMIC

FIELD OF THE INVENTION AND RELATED ART STATEMENT

This invention relates to a method for molding superplastic ceramic.

Since ceramic are excellent in heat resistance, abrasion resistance, and corrosion resistance, the desirability of using such ceramics have various parts has been finding growing recognition.

In the production of ceramic parts, fairly complicated shapes can be imparted thereto as by injection molding, cast molding, CIP, etc. The ceramic parts are shrunk by firing to a great extent and the degree of this shrinkage varies widely with the density of compressed powder, the temperature of sintering, etc. Thus, sintered ceramic parts cannot be expected to acquire a uniform and high dimensional accuracy. The sintered ceramic articles do not manifest any plastic deformation at room temperature but undergo brittle fracture. In the uniaxial tensile creep test at high temperature in a temperature zone exceeding 1200° C., the amount of deformation up to creep fracture is 0.8% in the case of a hot pressed silicon nitride article and not more than 3% in the case of a sintered silicon nitride article formed under normal pressure. These values are extremely small as compared with those of metallic materials. Thus, the sintered ceramic articles defy plastic fabrication. For these articles to be obtained in desired shapes, therefore, cutting, grinding, and other processing by the use of diamond grinding wheels or the like are indispensable.

It is known that a certain metal materials can be prepared in the form of very minute crystal grains and subjected to superplastic deformation at a strain speed falling in a limited range at a temperature falling in a limited range. It is also known that products of complicated shapes can be obtained rather inexpensively from an alloy material processed in the form of extremely minute crystal grains by superplastic deformation.

The prediction that the phenomenon of superplasticity will be realized even in ceramic is made in the paper "Evans et al.: Suppression of Cavity Formation in Ceramics: Prospects for Superplasticity, Journal of American Ceramic Society, Vol. 63, No. 7-8, p. 368, 1980."

In this paper, the conditions indispensable to a microfine system capable of suppressing cavity formation and enabling superplasticity are theoretically analyzed. Fine structure superplasticity has never been found, however, in sintered articles of such structural ceramic as silicon, silicon carbide, zirconia, and alumina.

OBJECT AND SUMMARY OF THE INVENTION

When ceramics which possess highly satisfactory properties are enabled to be plastically deformed, shaped articles of ceramic having high dimensional accuracy will be produced very easily and economically. The desirability of developing a technique for effecting plastic deformation of ceramic has been felt strongly. The inventors have made various studies in search of a method capable of the plastic deformation mentioned above.

To accomplish the object described above, this invention provides a method for the production of a shaped article of ceramic, characterized by causing a primary sintered article of superplastic ceramic to be deformed in a prescribed shape under the action of stress at a temperature in the range of superplastic temperatures of the sintered article. The superplastic ceramic mentioned above is composed of a zirconia toughened ceramic containing, or not containing at least one selected from the group consisting of mullite, spinel and alumina.

DETAILED DESCRIPTION OF THE PREFERRED EMBODIMENT

The inventors continued a study on the mechanism of deformation of the zirconia toughened ceramic composed of microfine crystal grains. They consequently found that when the temperature and speed of deformation are suitably limited, the zirconia toughened ceramic in a uniaxial tensile creep test at high temperature exhibits a large ductility such that the amount of deformation exceeds 100%. The manifestation of this ductility is ascribable to the mutual grain boundary sliding of microfine crystal grains. The deformation produced on test pieces is uniform and shows no discernible sign of local necking.

The "superplasticity" of a metal is defined as the ability of the metal to be stretched under a level of stress notably lower than the general yield point to a degree of at least 100% without inducing the phenomenon of necking.

For the first time, the inventors have found the phenomenon of superplasticity in the sense of the word mentioned above in microfine crystal grains of zirconia toughened ceramic as a structural ceramic. This invention has been perfected as a result.

The ceramic exhibiting the superplasticity of this invention is a pimary sintered article. The definition of the term "superplasticity" can be paraphrased as the phenomenon of a polycrystalline solid material exhibiting an unusually large elongation (not less than 100%) under a low level of stress in a tensile test. The term "primary sintered article" means both a slightly sintered article having voids and a tight sintered article which are yet to be finished as end products.

The superplastic ceramic necessary for this invention is zirconia toughened ceramic which may incorporate therein such additives as $Y_2O_3$, MgO, CaO, and $CeO_2$ in a concentration of from 2 mol % up to 20 mol %. The zirconia toughened ceramic is composed of zirconia of tetragonal system or cubic system. It is desired to contain not less than 20% by volume of microcrystalline zirconia of the tetragonal system at room temperature. The diameter of the individual crystal grains is desired to be not more than 2 $\mu$m, preferably not more than 1 $\mu$m.

The superplastic ceramic of the present invention may incorporate therein at least one member selected from the group consisting of mullite, spinel and alumina in a concentration of up to 90 wt %.

The method of this invention resides in causing a primary sintered article having the greater part of a prescribed shape thereof imparted thereto in advance by die molding, injection molding, or cast molding to be deformed by the action of pressure at a temperature in the range of superplastic temperatures. By the method of this invention, the efficiency of the molding of ceramic can be improved because the fabrication by superplastic deformation has only to be given to a very small portion of the shaped article requiring particularly high dimensional accuracy.

The formation of a product of complicated shape from a primary sintered article which is given as a material of rough shape is made possible by utilizing the superplasticity, i.e. an ability to be elongated to not less than 100%.

The superplastic fabrication of the zirconia toughened ceramic is carried out at a temperature approximately in the range of 1200° to 1600° C., preferably 1400° to 1500° C. If this temperature is lower than about 1200° C., the speed of deformation or fabrication is so lowered as to render the fabrication economically infeasible. If it exceeds 1600° C., the crystal grains of zirconia grow so much as to exceed their critical grain size and turn into a monocline crystal at room temperature and, therefore, cannot be expected to acquire a structure fortified by stress-induced transformation. In this case, though the deformation and fabrication become easy, the shaped article suffers from conspicuously lowered strength.

If the speed of fabrication is too high, the product of fabrication has insufficient strength and the shaped article under fabrication is liable to sustain fracture. The highest permissible speed of fabrication at which the formation of cavity is suppressed is determined by the temperature of fabrication. In the range of desirable temperatures of fabrication, 1400° to 1500° C., the speed of fabrication is desired to be not higher than $10^{-2}$ sec$^{-1}$, preferably not higher than $10^{-3}$ sec$^{-1}$.

The action of stress can be obtained by any of various methods involving pressing, forging, extruding and or the like or by the use of a ceramic mold or jig.

The mold used for this purpose may be a sintered article of silicon carbide, alumina, or mullite. When the mold is used in a reducing atmosphere or in a vacuum, it may be made of graphite, boron nitride, or superrefratory alloy.

Where the sintered article to be produced is a hollow article like a pipe it can be obtained by blow molding or bulge molding, i.e. by applying a gas pressure of some tens to some hundreds of atmospheres to the interior of the primary sintered article and, at the same time, pressing a ceramic mold of a prescribed shape against the exterior of the article.

This invention has the following characteristics.
(1) It suits the manufacture of parts possessing complicated curved surfaces.
(2) It enables parts to be produced with enhanced accuracy by improving the dimensional accuracy of a mold. It enables subtle qualities of the mold to be transferred to and reproduced on the molded products.
(3) It enables ceramic products to acquire improved surface roughness by using a mold having a specular surface. It is highly useful as means of surface finishing of ceramic articles.
(4) It has a speed of fabrication falling in a practical range and, therefore, is suitable for mass production.

As described above, accurately shaped articles of superplastic ceramic obtained by the method of this invention possess high dimensional accuracy and can be used advantageously as automobile engine parts and other structural parts.

Now, the present invention will be described more specifically below with reference to working examples.

EXAMPLE 1

An article of yttria-zirconia toughened ceramic (cubic system content 10% and tetragonal system content 90%) obtained by primary sintering of a powder prepared by coprecipitation was used as a test piece. This sintered article had a density of 6.03 g/cm$^3$ and had 3 mol % of yttria dissolved therein and had an average crystal grain diameter of 0.3 μm. The test piece was a cube of 3 mm and had a surface roughness of 2 μm. In the air at 1400° C., it was compression deformed at a speed of 0.05 mm/min ($2.7 \times 10^{-4}$ sec$^{-1}$) through the medium of a specularly polished plate of silicon carbide. After 40 minutes of compression deformation, the nominal strain reached 300%. Consequently, there was obtained a thin plate 1 mm in thickness. After superplastic molding, the test piece acquired a surface roughness of 0.1 μm. The sintered article so produced possessed highly desirable surface properties.

EXAMPLE 2

From the same primary sintered article as used in Example 1, a test piece possessing a cylindrical part 3 mm in diameter and 30 mm in length was prepared. At 1450° C., it was deformed by stretching at a speed pf 0.2 mm/min ($1.1 \times 10^{-4}$ sec$^{-1}$), to produce a slender bar 1.17 mm in diameter and 66 mm in length. The nominal strain was 120%.

The strength of the deformed test piece was more than 1000 MPa and it was found that there was little decrease in the strength of the test piece because of the superplastic processing.

EXAMPLE 3

In a specularly polished mold of silicon carbide a plate ($15 \times 15 \times 10$ mm) of zirconia toughened ceramic of the same composition as used in Example 1 was compression molded at 1450° C. at a speed of 0.05 mm/min ($2.7 \times 10^{-4}$ sec$^{-1}$) for 20 minutes to cause 1 mm of deformation. The surface roughness Rz of the zirconia plate was 0.8 μm before the deformation and 0.2 μm after the deformation, indicating that the compression brought about an improvement in the surface roughness.

EXAMPLE 4

In a specularly polished mold of alumina single crystal, a plate ($15 \times 15 \times 5$ mm) of zirconia toughened ceramic of the same composition as used in Example 1 was compressed at 1350° C. under a fixed stress of 5 MPa for 60 minutes. The amount of deformation produced on the zirconia toughened ceramic was 0.1 mm. The surface roughness Rz of the zirconia plate was 0.8 μm before the deformation and 0.01 μm after the deformation, indicating that the deformation improved the surface roughness to the level of a specular surface.

EXAMPLE 5

With a jig of silicon carbide, a block ($10 \times 10 \times 10$ mm) of zirconia toughened ceramic of the same composition as used in Example 1 was pressed at 1450° C. at a speed of 0.2 mm/min ($3.3 \times 10^{-4}$ sec$^{-1}$ for 30 minutes to produce superplastic deformation of a compression ratio of 60%. In this case, the fluid stress was 15 to 20 MPa.

EXAMPLE 6

A powdered solid solution of 3 mol % of $Y_2O_3$ in $ZrO_2$ (having a tetragonal system content of 90% and a cubic system content 10%) was mixed with 20% by weight of powdered $Al_2O_3$. A sintered mass was obtained by firing the resulting mixed powder. A zirconia-alumina composite material was obtained by subjecting this sintered mass to a HIP treatment. From this composite material, a test piece 5 mm×5 mm×5 mm was prepared. This test piece was compression molded under the conditions of 1550° C. of temperature and 0.05 mm/min of crosshead speed. It was rollable up to 60% of compression ratio. The resistance to deformation fell in the range of 5 to 7 MPa. The crystal particles of the test piece had diameters of 0.5 to 1 μm.

EXAMPLE 7

A sintered plate 10 mm in thickness of a solid solution of 12 mol % of $CeO_2$ in tetragonal system zirconia grains (about 1 μm in diameter) was rolled until the thickness decreased to 7 mm under the conditions of 1500° C. of temperature and 0.05 mm/min of speed of pressing. The resistance to deformation was 25 to 30 MPa.

What is claimed is:

1. A method for the production of a shaped ceramic article, comprising:
    subjecting a preliminarily sintered shaped article of a zirconia-toughened ceramic, which exhibits an elongation of not less than 100%, as determined by the uniaxial tensile test, and which contains not less than 20% by volume of zirconia grains, to a stretching stress at a strain rate of not more than $10^{-2}$ sec.$^{-1}$ over the temperature range of 1200° to 1600° C., thereby superplastically deforming the zirconia-toughened ceramic and obtaining a shaped article of improved surface roughness and dimensional accuracy.

2. The method according to claim 1, wherein said zirconia grains are microcrystals which have a grain size of not more than 2 μm.

3. The method according to claim 1, wherein said zirconia-toughened ceramic contains at least one additive component selected from the group consisting of $Y_2O_3$, MgO, CaO and $CeO_2$.

4. The method according to claim 1, wherein said zirconia-toughened ceramic further comprises at least one microfine powdered material selected from the group consisting of alumina, mullite and spinel.

5. The method according to claim 1, wherein said superplastic deformation occurs over the temperature range of 1400° C. to 1500° C.

6. The method according to claim 2, wherein the diameter of said crystal grains is not more than 1 μm.

* * * * *